United States Patent [19]

Grevstad

[11] 4,035,551
[45] July 12, 1977

[54] ELECTROLYTE RESERVOIR FOR A FUEL CELL

[75] Inventor: Paul E. Grevstad, West Hartford, Conn.

[73] Assignee: United Technologies Corporation, Hartford, Conn.

[21] Appl. No.: 719,877

[22] Filed: Sept. 1, 1976

[51] Int. Cl.² .......................................... H01M 8/02
[52] U.S. Cl. .................................... 429/44; 429/41
[58] Field of Search ...................... 429/41, 209, 44

[56] References Cited

U.S. PATENT DOCUMENTS 3,905,832  9/1975  Trocciola .......................... 429/39

Primary Examiner—John H. Mack
Assistant Examiner—H. A. Feeley
Attorney, Agent, or Firm—Stephen E. Revis

[57] ABSTRACT

An electrolyte reservoir layer disposed behind and adjacent one of the catalyst layers of a fuel cell is a porous, hydrophilic material. Excess liquid volume wicks into the reservoir layer through the catalyst layer and fills the smaller pores within the reservoir. The larger pores remain empty and provide clear passageways for the reactant gas to reach the catalyst. Wet-proofing of the reservoir layer is not required. In a preferred embodiment the reservoir layer is the electrode substrate whereby the catalyst layer is bonded to the surface thereof.

13 Claims, 1 Drawing Figure

U.S. Patent          July 12, 1977          4,035,551
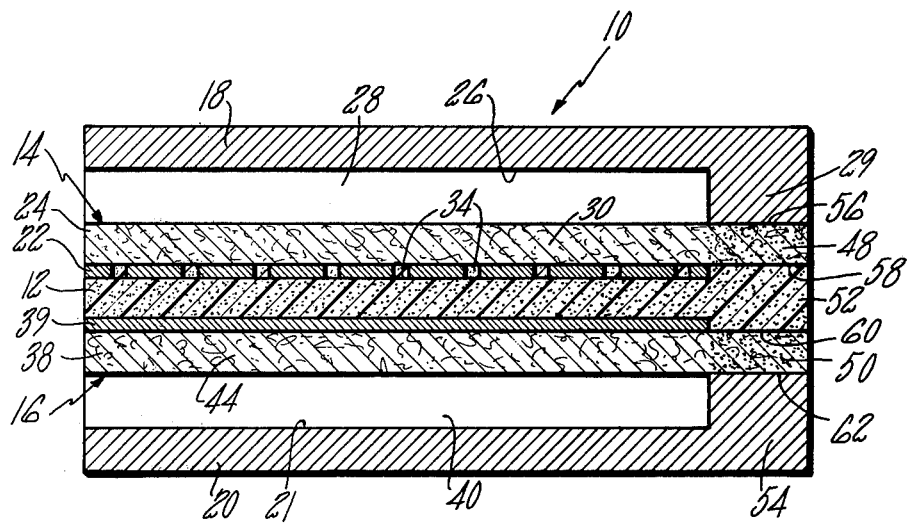

ELECTROLYTE RESERVOIR FOR A FUEL CELL

RELATED APPLICATIONS

The following commonly owned U.S. Patent Applications were filed on even date herewith and include subject matter related to the present application:

"Electrolyte Reservoir for a Fuel Cell" by C. Bushnell and H. Knuz, U.S. Ser. No. 619,876.

"Electrolyte Reservoir for a Fuel Cell" by J. Lamarine, R. Stewart, Jr. and R. Vine, U.S. Ser. No. 719,875.

BACKGROUND OF THE INVENTION

1. Field of the Invention

This invention relates to fuel cells, and more particularly to electrolyte volume control within a fuel cell.

2. Description of the Prior Art

In a fuel cell, electrolyte is disposed between a pair of spaced apart electrodes. The electrodes often comprise a substrate and a catalyst; the substrate is provided simply to carry the catalyst and must be designed such that during operation the catalyst is in continuous contact with the electrolyte. The electrode must also be constructed to permit the reactant, such as gaseous hydrogen, to enter the substrate and also contact the catalyst. In the prior art it is generally considered that a three-phase interface is formed between the reactant gas, the catalyst, and the electrolyte, at which place the electrochemical reaction occurs. Many early electrodes, such as those used in the cells described in U.S. Pat. Nos. 2,959,315 and 2,928,783 used porous nickel electrodes wherein the catalyst was distributed uniformly throughout the thickness of the entire electrode. These early cells incorporated a circulating electrolyte so that the water could be either added or removed external of the cell, thereby maintaining a relatively constant volume of electrolyte within the cell. In any event, small changes in electrolyte volume simply changed the location of the three-phase interface within the electrode substrate.

Later cells went to a non-circulating or trapped electrolyte disposed in a matrix sandwiched between the electrodes. In these cells water produced during operation is removed by evaporating it into one of the reactant gas streams. In order to reach the reactant gas stream water vapor must be able to pass through the electrode, yet one could not permit the electrode to completely fill with liquid since this might prevent the reactant gas from entering the electrode to react with the electrolyte at the catalyst sites. Efforts to avoid this type of problem resulted in the development of biporous electrodes. One such biporous electrode is described in U.S. Pat. No. 3,077,508 beginning at line 2 of column 4. As described therein, the biporous structure generally includes a large pore layer on the gas contacting side and a small or fine pore layer on the electrolyte contacting side. The fine pore layer would necessarily be activated with a catalyst. This might also be true of the large pore layer, although it is not a requirement. The high capillary action in the fine pore layer strongly held the electrolyte, while the large pore layer would remain relatively free from electrolyte and would therefore always permit the reactant gas to enter the electrode substrate. The electrochemical reaction took place at approximately the boundary between the large and small pore layers wherein a three-phase interface exists. However, the small pore layer of these early cells were generally very thin such that other provisions were required for electrolyte volume changes.

In an electrode having a catalyst uniformly distributed throughout the substrate it does not matter if, for example, the electrolyte fills half or three-quarters of the electrode thickness since there is always catalyst at the boundary between the electrolyte and reactant gas. Thus, it is only necessary that the reactant gas be able to penetrate through the portion of the electrode not filled with electrolyte. However, electrochemical activity only occurs at the three-phase interface, and the catalyst not disposed at that interface does not react and is virtually being wasted. Further development led to electrodes wherein the catalyst was not dispersed throughout the entire substrate, but was rather applied as a very thin layer to the surface of the substrate adjacent the electrolyte. In that type of electrode it is required that there always be gas passageways extending all the way through the substrate to the catalyst layer. In order to ensure that the reactant gas reaches the catalyst layer, it has always been considered necessary to use a hydrophobic substrate which cannot hold significant electrolyte and therefore cannot block the passage of reactant gas through the substrate to the catalyst layer. This is the most common type of electrode in use today. However, in non-circulating electrolyte type cells, it is still necessary to remove excess water by evaporating it into one of the reactant gas streams and/or to be able to store excess electrolyte volume some place within the cell, particularly at shutdown when the water vapor within the gas stream and from the surrounding atmosphere condenses to a liquid. With hydrophobic substrates the condensed water vapor would increase the volume of the electrolyte and may form a film on liquid on the backside or inside the substrate which acts as a barrier to gas flow through the substrate when the cell is put back into operation.

Solutions to the above discussed problems are shown and described in commonly owned U.S. Pat. Nos. 3,779,811 and 3,905,832. In the former patent a porous electrolyte reservoir plate (ERP) is disposed in the reactant gas passage and is spaced from the electrode. Porous pins provide electrolyte communication between the porous plate and the electrode. The electrolyte volume of the cell is controlled by electrolyte movement through the pins of the porous plate, thereby stabilizing the electrochemical performance of the cell and preventing flooding of the electrode. Note that in the embodiment described therein the electrode comprises a conductive nickel screen embedded in a uniform admixture of platinum plus polytetrafluoroethylene particles thereby making the electrode basically hydrophobic. In U.S. Pat. No. 3,905,832 hydrophilic material is disposed behind and in contact with a hydrophobic electrode substrate to act as an electrolyte reservoir. Communication between the reservoir material and the electrolyte matrix is provided by, for example, holes through the electrode filled with a hydrophilic material or by leaving discrete portions of the electrode substrate hydrophilic to provide wicking paths between the electrolyte matrix and the reservoir material. In this manner excess electrolyte has a place to go without significantly affecting the flow of gas through the hydrophobic areas of the substrate.

While the inventions described in the foregoing two patents work well, they have certain drawbacks. One drawback is increased cell thickness. Another is the increase in IR losses due to either reduced contact between the electrode and separator plate or by the addition of additional material through which the electric current must pass. Increased cost is another problem; this is not only due to the cost of the reservoir layer or material itself, but may also include increased electrode fabrication costs, such as would be required with the invention described in the U.S. Pat. No. 3,905,832.

SUMMARY OF THE INVENTION

One object of the present invention is an electrochemical cell which can accommodate changes in electrolyte volume and which is thin, easy to fabricate, and relatively inexpensive.

According to the present invention, in an electrochemical cell one of the electrodes includes a catalyst layer and is disposed adjacent to or bonded to the electrolyte facing side of a gas porous totally hydrophilic substrate which also functions as an electrolyte reservoir. In a preferred embodiment this substrate is disposed behind the anode catalyst.

Unlike electrochemical cells of the prior art, there is no separate layer of electrolyte reservoir material behind the substrate; therefore, there are no holes required through the substrate nor are special treatments required to be performed on the substrate to provide wicking paths from the electrolyte matrix to the reservoir layer. The substrate (i.e., electrolyte reservoir layer) is simply hydrophilic material having a range of pore sizes which are randomly distributed throughout. The smaller pores function as a reservoir for excess electrolyte while the larger pores remain substantially free from electrolyte thereby providing the necessary gas passageways through the substrate to the catalyst layer.

In order to ensure that the electrolyte matrix is always filled with electrolyte, the pores of the substrate should be no smaller than the largest pores of the maytrix. By this construction the capillary forces within the substrate will be less than the capillary forces within the matrix; therefore, electrolyte will not be drawn into the substrate unless there is more than enough electrolyte to fill the matrix. On the other hand, as electrolyte volume within the cell decreases, the electrolyte will first empty from the substrate into the matrix thereby preventing dry out of the matrix.

It has been found, quite unexpectedly, that a porous, hydrophilic substrate having a range of pore sizes randomly distributed throughout retains sufficient porosity, even when partially filled with electrolyte, such that reactant gas can readily pass through the substrate in a direction perpendicular to its thickness without the necessity of providing hydrophobic areas. It has been found, for example, that a variety of carbon papers having a wide range of pore spectra characteristics function well as electrolyte reservoirs while simultaneously serving as electrode substrates.

In a preferred embodiment, wherein the electrolyte reservoir layer hereinabove referred to is behind the anode catalyst layer, the substrate or layer behind the cathode catalyst layer is also porous and totally hydrophilic. Its pore size is selected to be larger than that of the layer behind the anode catalyst so that during operation it remains nearly dry and most liquid volume changes are accommodated by the reservoir layer behind the anode catalyst. At shutdown it is able to absorb and hold the large amounts of water which condense from the surrounding atmosphere. At start-up it quickly empties to permit oxidant to pass readily therethrough.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a transverse sectional view showing an electrochemical cell according to the present invention.

DESCRIPTION OF THE PREFERRED EMBODIMENT

Referring to FIG. 1, which is an exemplary embodiment of the present invention, a fuel cell is shown and is designated by the numeral 10. The fuel cell 10 includes and electrolyte retaining matrix 12, an anode electrode 14, a cathode electrode 16, and gas separators 18, 20. The cell in this embodiment uses phosphoric acid as the electrolyte, however, it will become apparent that the invention is equally applicable to cells using any type of electrolyte such as potassium hydroxide or molten carbonate.

The anode electrode 14 includes a catalyst layer 22 bonded to a reservoir layer 24; thus, the reservoir layer is also an electrode substrate in this embodiment. The gas separator 18 includes a central portion 26 and an edge portion 29. The central portion is spaced from the reservoir layer 24 thereby defining a fuel space 28 therebetween into which hydrogen or other suitable fuel is introduced. In a stack of fuel cells the separator 18 would have oxidant on the other side thereof for feeding the cathode electrode of an adjacent cell. The portion of the reservoir layer 24 which is directly exposed to the fuel in the fuel space 28 is herein referred to as the reservoir layer active portion 30. The portion of the catalyst layer adjacent the active portion 30 is herein referred to as the active area of the catalyst layer. The active portion 30 is hydrophilic to the electrolyte, porous, and does not include any catalyst or hydrophobic material other than, perhaps at the surface where the catalyst layer 22 is bonded thereto due to some unavoidable penetration of the catalyst layer into the surface pores of the reservoir layer when it is applied thereto. The reservoir layer 24 may be made from any porous, hydrophilic material which is electrically conductive and which is virtually inert to the electrolyte. Carbon paper of the same type typically used as an electrode substrate in the prior art makes a good reservoir material in phosphoric acid electrolyte cells. The catalyst layer 22 is comprised of catalyst particles bonded together with a hydrophobic material such as polytetrafluoroethylene. A preferred catalyst is platinum supported on carbon particles. The composition of the catalyst layer is not critical to the present invention and any known catalyst layer composition or newly developed catalyst composition will most likely be suitable for use in the present invention.

As is well known in the art, it is essential that the matrix 12 always be completely filled with electrolyte, both during operation and during shutdown. Thus, prior to being put into operation for the first time, at least as much electrolyte as necessary to completely fill the matrix is introduced into the fuel cell and perhaps somewhat more. During operation the fuel cell produces water which dilutes the electrolyte and increases its total volume to beyond that which can be stored within the matrix. Furthermore, when the cell is shut down its liquid volume may increase by a factor of two or three as it adsorbs water vapor from the atmosphere and fuel spaces. This excess liquid volume must have a place to go. The reservoir layer 24 provides this storage space within its pores. Transfer of this excess liquid as it builds up in the matrix 12 must be through the catalyst layer 22. For the purpose of assuring ease of liquid transfer between the matrix 12 and the reservoir layer 24, in either direction, holes 34 are provided through the catalyst layer. These holes are preferably filled with a hydrophilic material such as the same material of which the matrix is made. Although in this embodiment holes are shown through the catalyst layer 22, it has been found that these holes may not be necessary in many instances because the catalyst layer 22 includes both hydrophilic and hydrophobic pores; tests have shown that there is usually sufficient electrolyte transfer capability via the hydrophilic catalyst layer pores. In any event, the holes may be included simply as a precautionary measure.

Liquid transfer within the cell occurs through the action of capillary forces. The smaller the pore, the larger the capillary force and the greater the liquid retention capability. Since the matrix 12 must always remain filled with electrolyte it must have smaller pores than the reservoir layer 24, otherwise the electrolyte in the matrix 12 would be drawn into the pores of the reservoir layer thereby leaving the matrix partially empty. In accordance with the present invention substantially all the pores of the reservoir layer 24 are larger than the pores of the matrix; thus the reservoir layer pores will only become filled after the matrix is filled and they will empty into the matrix if the liquid volume in the cell decreases.

Of course, the hydrogen or other fuel gas must always be able to pass through the reservoir layer 24 to the catalyst layer 22 during operation of the cell. In the prior art it has always been thought that any layers separating the fuel space from the catalyst layer must be provided with either holes or hydrophobic areas to assure clear gas passageways. It has, however, been unexpectedly discovered that this is not necessary. It has been discovered that a reservoir layer 24 which is continuous (i.e., no holes) and has a thickness no greater than the thickness of prior art electrode substrates has sufficient volume in its smaller pores to hold the excess volume of liquid such that its larger pores remain empty and provide clear paths for the gas to pass from the fuel space through the reservoir layer to the catalyst layer. This was found to be true for carbon papers which have a wide range of pore spectra characteristics as shown in Table 1. It is expected that other porous electrode substrate materials with similar pore spectra properties will perform satisfactorily, such as porous hydrophilic polymers (i.e., polysulfone which has been treated to make it wettable); sintered metals may be used in base electrolyte cells.

Testing of cells according to the present invention has shown that satisfactory operation is achieved when the reservoir layer is 60% filled with electrolyte. For the cells tested and described in the examples set forth hereinafter, this is approximately two to three times the fill volume at which the cells would normally operate. This is not to say that as the reservoir layer fills it has no effect on the distribution of the fuel into the catalyst layer; however, the diffusion characteristics of hydrogen are such that the anode side of a fuel cell is quite tolerant to the reduced availability of fuel. The required thickness of the reservoir layer will depend upon such factors as the maximum amount of liquid expected, the porosity of the material used, plus a reasonable safety factor. This thickness can readily be determined by persons having ordinary skill in the art.

On the other hand, the cathode electrode is not as tolerant to the reduced availability of the oxidant as the anode electrode is to the reduced availability of hydrogen. It is for this reason that electrolyte storage is preferred behind the anode catalyst rather than behind the cathode catalyst. For many applications an ordinary, wetproofed cathode electrode may be used in combination which the anode reservoir layer of the present invention. However, it is desirable for the substrate layer behind the cathode electrode to hold electrolyte when the cell is shutdown and the electrolyte volume increases to several times its operating volume due to the condensation of liquid from a humid atmosphere. Thus, in the preferred embodiment of FIG. 1, the cathode electrode 16 also comprises a nonwetproofed substrate 38 having a catalyst layer 39 bonded thereto. The separator 20 includes a central portion 21 spaced from the substrate 38 defining an oxidant space 40 therebetween. The portion of the substrate 38 which is directly exposed to the oxidant in the space 40 is herein referred to as the substrate active portion 44. The portion of the catalyst layer 39 adjacent the active portion 44 is the active area of the catalyst layer. As hereinabove discussed, the substrate 38 is not intended to be for the purpose of storing excess electrolyte while the cell is operating; for that reason it is not referred to as a reservoir layer. However, like the reservoir layer 24 and contrary to the prior art it contains no wetproofing or hydrophobic material in its active portion 44; it differs from the reservoir layer 24 only in the fact that most of its pores (the more the better) in the active portion are larger in size than those pores of the active portion 30 of the reservoir layer 24 which fill with electrolyte during cell operation. This means the active portion of the substrate 38 may have some pores smaller than the largest pores of the active portion of the reservoir layer 24; however, most of these smaller pores remain dry during cell operation since most of the required electrolyte storage, while the cell is operating, is in the even smaller pores of the reservoir layer. Only at shutdown will there be sufficient liquid volume to fill the larger pores of the substrate active portion. In this manner excess electrolyte first travels into the reservoir layer 24 rather than into the substrate 38. The only time the substrate 38 might collect large amounts of liquid is at shutdown as discussed above. Upon start-up it will be the first to empty since it has the largest pore size of all the components.

In the usual sense the word substrate means the layer behind the catalyst and to which the catalyst is bonded. Thus, in the preferred embodiment hereinabove described the reservoir layer 24 is also a substrate. However, for the purposes of this application, including the claims, the word substrate is intended to mean the layer immediately behind the catalyst layer, whether or not the catalyst layer is bonded thereto. Thus, the layer 38 would be a substrate even if the cathode catalyst layer 39 were bonded to the surface of the matrix 12 and not to the layer 38.

According to a further aspect of the present invention the reservoir layer 24 and the substrate 38 each include peripheral sealing portions 48, 50 respectively. These sealing portions are sandwiched between the edge portion 52 of the matrix 12 and the edge portions 29, 54 of the gas separators 18, 20 respectively. The sealing portions 48, 50 are impregnated, such as with the material of which the matrix 12 is made, in order that the pore size distribution of the sealing portions is approximately the same as that of the matrix 12. Thus, the sealing portions 48, 50 will always remain filled with electrolyte as long as the matrix 12 is filled with electrolyte. Liquid seals are thereby formed at the surfaces 56, 58, 60 and 62 in the manner described in U.S. Pat. No. 3,867,206 of common assignee with the present invention and which is incorporated herein by reference. The seals prevent the escape of reactant gas from within the cell. The present invention, however, does not depend on the type of seals described above; it functions equally well with any type of seal arrangement.

This invention provides several advantages over the prior art. For example, it eliminates the costly steps of wetproofing the electrode substrates in order to make them hydrophobic in at least select areas to assure gas passageways. The reservoir layer also serves as the electrode substrate thereby eliminating the need for a separate substrate layer and reservoir layer. In comparison to structures having separate reservoir layers behind electrode substrate layers, hydrogen diffusion losses are potentially lower since the flow of hydrogen is only through the reservoir layer to the catalyst rather than through a reservoir layer and an electrode substrate. Also, cell weight and thickness may be reduced since the reservoir layer alone is no thicker than the combination of a substrate and reservoir layer. In the alternative, for a given cell thickness the electrolyte volume storage capacity may be increased.

Table 1 gives properties of various carbon papers which have been successfully tested as reservoir layers in accordance with the present invention. Note that the mean pore size for the various papers is anywhere from 14 to 83 microns and that wide pore size distributions as well as relatively narrow pore size distributions is satisfactory. The matrices and edge seals used in cells made of these substrates and reservoir layers had pore sizes ranging from 1.0 to 5.0 microns.

TABLE 1

CARBON PAPERS USED AS FUEL CELL ELECTRODE RESERVOIRS ACCORDING TO THE PRESENT INVENTION

| | Mean Pore Size (microns) | Pore Size Range (microns) | | Porosity (%) | Thickness (mils) |
|---|---|---|---|---|---|
| | | Min. | Max. | | |
| A | 83 | 60 | 110 | 80 | 19 |
| B | 41 | 19 | 85 | 75 | 14 |
| C | 59 | 42 | 86 | 85 | 15 |
| D | 59 | 39 | 86 | 86 | 18 |
| E | 14.4 | 2.5 | 82 | 82 | 13 |
| F | 16 | 3 | 83 | 83 | 15 |
| G | 14 | 6 | 75 | 75 | 16 |
| H | 17 | 3 | 88 | 88 | 16 |

EXAMPLE I

In one test the anode reservoir layer and the cathode substrate were made of the carbon paper designated B in Table 1. The anode reservoir layer included no wetproofing while the cathode substrate was wetproofed with a loading of 4 mg/cm$^2$ of polytetrafluoroethylene (PTFE). The matrix comprised 96% silicon carbide and 4% PTFE, was 10 mils thick and had a mean pore size of 2 microns. Performance of the cell was as good as other cells utilizing conventional wetproofed anode substrates.

EXAMPLE II

In another cell the reservoir layer behind the anode catalyst layer was the carbon paper designated C in Table 1 and included no hydrophobic wetproofing material. The cathode substrate was made from the carbon paper designated E in Table 1 and was wetproofed with 4 mg/cm$^2$ PTFE. The matrix was the same as that used in Example I. This cell also performed as well as cells using conventional electrodes having wetproofed substrates.

EXAMPLE III

An all hydrophilic cell was also tested. The anode reservoir layer was made from carbon paper designated B in Table 1 and included no wetproofing anywhere. The cathode substrate was made from carbon paper designated A in Table 1 and also included no wetproofing material. The matrix was the same as that used in Examples I and II and the edges of the anode reservoir layer and the cathode substrate were impregnated with silicon carbide/PTFE to form wet seals. Note the overlap in pore size range between the anode reservoir layer and the cathode substrate. This presented no problems, since during operation of the cell the smaller pores of the partially filled anode reservoir layer kept the cathode substrate essentially dry. (The calculated electrolyte inventory in the cathode was less than 5% of its pore volume based on the pore spectra of the anode and cathode.) Although the cell performance was only about 95% of the performance of a conventional cell with wetproofed anodes and cathodes, it is not believed the lower performance was caused by the concept of the present invention.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the Unites States is:

1. In a fuel cell comprising an electrolyte retaining matrix, an anode catalyst layer in contact with one side of said matrix and a cathode catalyst layer in contact with the other side of said matrix, each of said catalyst layers including both hydrophilic and hydrophobic pores, the improvement comprising:
   a reservoir layer in intimate contact with essentially the entire non-matrix facing side of at least one of said catalyst layers, said reservoir layer being continuous, porous, totally hydrophilic to the electrolyte, and essentially free from catalyst, said reservoir layer having a range of pore sizes randomly distributed throughout with substantially no pores smaller than the largest pores of said matrix and having the characteristic that during cell operation it is simultaneously partially filled with electrolyte and gas porous; and
   means defining a reactant gas space adjacent the noncatalyst facing side of said reservoir layer.

2. The improvement according to claim 1, wherein said one catalyst layer is bonded to said reservoir layer.

3. The improvement according to claim 1, wherein said one catalyst layer includes a plurality of uniformly distributed passages therethrough interconnecting said matrix and said reservoir layer.

4. The improvement according to claim 3, wherein said passages are holes through said catalyst layer.

5. The improvement according to claim 4, wherein said holes are filled with hydrophilic material.

6. The improvement according to claim 5, wherein said hydrophilic material is essentially the same material as said matrix.

7. The improvement according to claim 1, wherein said one catalyst layer is said anode catalyst layer.

8. The improvement according to claim 7, wherein said reservoir layer is carbon paper.

9. The improvement according to claim 8, wherein said matrix includes phosphoric acid electrolyte.

10. The improvement according to claim 7, including a substrate in intimate contact with essentially the entire non-matrix facing side of said cathode catalyst layer, said substrate being continuous, porous, totally hydrophilic to the electrolyte, and substantially free from catalyst, said substrate having a range of pore sizes randomly distributed throughout with most pores larger than those pores of said reservoir layer which fill with electrolyte during operation of said fuel cell.

11. In a fuel cell comprising phosphoric acid electrolyte retained in a matrix, an anode electrode disposed on one side of said matrix and a cathode electrode disposed on the other side of said matrix, the improvement comprising:

said anode electrode including an anode catalyst layer and a carbon paper reservoir layer, said anode catalyst layer including both hydrophilic and hydrophobic pores and being in contact with said matrix, said reservoir layer being in intimate contact with essentially the entire non-matrix facing side of said anode catalyst layer, said reservoir layer being continuous, porous, totally hydrophilic to the electrolyte, essentially free from catalyst, and having a range of pore sizes randomly distributed throughout with substantially no pores smaller than the largest pores of said matrix, said reservoir layer having the characteristic that during cell operation it is simulatneously partially filled with electrolyte and gas porous; and means defining a reactant gas space adjacent the noncatalyst facing side of said reservoir layer.

12. The improvement according to claim 11, wherein said anode catalyst layer includes a plurality of uniformly distributed holes through said catalyst layer, said holes being filled with essentially the same material as said matrix.

13. The improvement according to claim 11, wherein said cathode electrode includes a cathode catalyst layer and a substrate, said cathode catalyst layer being bonded to said substrate, including both hydrophilic and hydrophobic pores, and being in contact with said matrix, said substrate being in intimate contact with essentially the entire one-matrix facing side of said cathode catalyst layer, said substrate being continuous, porous, totally hydrophilic to the elecrolyte, essentially free from catalyst, and having a range of pore sizes randomly distributed throughout with most pores larger than those of said reservoir layer which fill with electrolyte during operation of said fuel cell.

* * * * *

UNITED STATES PATENT OFFICE
CERTIFICATE OF CORRECTION

PATENT NO. : 4,035,551
DATED : July 21, 1977
INVENTOR(S) : Grevstad, Paul E.

It is certified that error appears in the above-identified patent and that said Letters Patent are hereby corrected as shown below:

Column 1, line 9 - "Knuz" should read --Kunz-- line 32 - "2,959,315" should read --2,969,315--

Claim 13, column 10, line 28 - "one-matrix" should read

--non-matrix-- line 30 - "elecrolyte" should read

--electrolyte--

Signed and Sealed this

Twenty-seventh Day of September 1977

[SEAL]

Attest:

RUTH C. MASON
Attesting Officer

LUTRELLE F. PARKER
Acting Commissioner of Patents and Trademarks